US012671275B2

(12) United States Patent
Enderlin et al.

(10) Patent No.: US 12,671,275 B2
(45) Date of Patent: Jun. 30, 2026

(54) WIRELESS POWER TRANSMISSION SYSTEM

(71) Applicant: Delta Electronics (Thailand) Public Co., Ltd., Samutprakarn (TH)

(72) Inventors: Jonas Enderlin, Teningen (DE); Ulrich Richter, Freiburg (DE)

(73) Assignee: Delta Electronics (Thailand) Public Co., Ltd., Samutprakarn (TH)

( * ) Notice: Subject to any disclaimer, the term of this patent is extended or adjusted under 35 U.S.C. 154(b) by 0 days.

(21) Appl. No.: 18/636,296

(22) Filed: Apr. 16, 2024

(65) Prior Publication Data

US 2024/0364146 A1 Oct. 31, 2024

(30) Foreign Application Priority Data

Apr. 27, 2023 (EP) ..................................... 23170444

(51) Int. Cl.
| | |
|---|---|
| *H02J 50/90* | (2016.01) |
| *B60L 53/12* | (2019.01) |
| *H02J 50/10* | (2016.01) |
| *H02J 50/40* | (2016.01) |
| *H02J 50/80* | (2016.01) |

(52) U.S. Cl.
CPC .............. *H02J 50/90* (2016.02); *B60L 53/12* (2019.02); *H02J 50/10* (2016.02); *H02J 50/402* (2020.01); *H02J 50/80* (2016.02)

(58) Field of Classification Search
CPC .. H02J 50/90; H02J 50/80; H02J 50/10; H02J 50/402; B60L 53/12
USPC ........................................................ 307/104
See application file for complete search history.

(56) References Cited

U.S. PATENT DOCUMENTS

| | | | | |
|---|---|---|---|---|
| 9,379,571 | B2 * | 6/2016 | Boyer | ................... B60L 53/122 |
| 9,908,423 | B2 * | 3/2018 | Bell | ........................ B60L 53/38 |
| 11,198,370 | B2 * | 12/2021 | Seong | ..................... H02J 50/90 |
| 11,362,545 | B2 | 6/2022 | Sieber et al. | |
| 11,368,051 | B2 * | 6/2022 | Lee | .......................... H02J 50/80 |
| 2012/0262002 | A1 | 10/2012 | Widmer et al. | |

(Continued)

FOREIGN PATENT DOCUMENTS

| | | |
|---|---|---|
| EP | 3875305 A1 | 9/2021 |
| KR | 101704934 B1 | 2/2017 |
| WO | 2019015759 A1 | 1/2019 |

OTHER PUBLICATIONS

The extended European search report issued on Oct. 11, 2023.

*Primary Examiner* — Alfonso Perez Borroto
(74) *Attorney, Agent, or Firm* — CKC & Partners Co., LLC

(57) ABSTRACT

The present disclosure concerns a wireless power transmission system, comprising a primary unit including a primary pad for wireless power transmission and a primary wireless communication unit; a secondary unit including a secondary pad for wireless power reception and a secondary wireless communication unit; and a control unit; wherein the primary pad and the secondary pad are configured to wirelessly transfer power via inductive coupling, wherein the primary and secondary wireless communication units are configured to transmit and receive a communication signal, and wherein the control unit is configured to detect a relative position of the primary wireless communication unit and the secondary wireless communication unit using the communication signal.

18 Claims, 4 Drawing Sheets

(56) References Cited

U.S. PATENT DOCUMENTS

| 2013/0049457 A1* | 2/2013 | Komatsu | B60L 58/22 |
| | | | 429/10 |
| 2014/0285030 A1* | 9/2014 | Nakamura | B60L 53/30 |
| | | | 307/104 |
| 2017/0111088 A1 | 4/2017 | Seong et al. | |
| 2018/0054086 A1 | 2/2018 | Jung | |
| 2019/0097447 A1 | 3/2019 | Partovi | |
| 2020/0164754 A1* | 5/2020 | Seong | H02J 50/12 |
| 2021/0210989 A1 | 7/2021 | Goodchild et al. | |
| 2021/0221244 A1 | 7/2021 | Kuhr et al. | |
| 2021/0306209 A1* | 9/2021 | Sakakibara | H02J 50/12 |
| 2023/0111339 A1* | 4/2023 | Kaburagi | H02J 50/12 |
| | | | 320/108 |

* cited by examiner

WIRELESS POWER TRANSMISSION SYSTEM

CROSS-REFERENCE TO RELATED APPLICATION

The present application claims priority to European Patent Application No. 23170444.6, filed to European Patent Office on Apr. 27, 2023, which is hereby incorporated by reference in its entirety.

TECHNICAL FIELD

The present disclosure concerns a wireless power transmission system.

BACKGROUND

Conventionally, wireless power transmission systems are known. Therein, a primary power transmission unit wirelessly transmits electric power via a time-varying electromagnetic field to a secondary power reception unit. Especially in applications in which an electric vehicle is supplied with power via wireless power transmission, for example for charging of its batteries, accurate alignment of the primary power transmission unit and the secondary power reception unit, the latter being commonly provided on the vehicle side, is challenging.

One approach for aligning primary and secondary power transmission/reception units is known from US 2012/0262002 A1 or U.S. Pat. No. 11,362,545 B2. In the latter, additional sensor coils as well as additional control and evaluation electronics for foreign object detection (FOD) are provided on a primary (transmission) side and a passive beacon is provided on the secondary (reception) side. The position of the passive beacon is determined based on a modulation signal therefrom. Such a sensing of position based on FOD and a passive beacon however requires bulky and costly additional sensor and beacon coils on primary and secondary side. Furthermore, evaluation of the modulation signal is complicated, necessitating costly processing components.

Furthermore, from KR 101704934 B1, a wireless charging pad and method using auto alignment for maximum power receiving are known. Therein, received power is measured in real time for aligning the pads. Such methods are, however, not suitable for accurate alignment, especially in three-dimensional space.

From EP 3875305 A1, communication links between a primary pad and a secondary pad are known.

The conventionally known alignment methods are however either based on additional sensors or beacons, which are costly, bulky, and inefficient, or are based on the received power from the wireless transmission, which is however inaccurate in providing three-dimensional alignment between the primary pad and the secondary pad.

SUMMARY

It is thus an object of the present invention to provide a wireless power transmission system which overcomes these deficiencies. In particular, it is an object of the present invention to provide a wireless power transmission system which can accurately determine relative positions of a primary pad and a secondary pad.

The solution of this object is achieved by the features of the independent claim. The dependent claims contain advantageous embodiments of the present invention.

In particular, the solution of this object is achieved by a wireless power transmission system comprising a primary unit, a secondary unit, and a control unit. Therein, the primary unit includes a primary pad for wireless power transmission and a primary wireless communication unit. Further, the secondary unit includes a secondary pad for wireless power reception and a secondary wireless communication unit. The primary pad and the secondary pad are configured to wirelessly transfer power via inductive coupling. Further, the primary and secondary wireless communication units are configured to transmit and receive a communication signal. The control unit is configured to detect a relative position of the primary wireless communication unit and the secondary wireless communication unit using the communication signal.

Herein, in an implementation of the present disclosure, the term "relative position of the primary wireless communication unit and the secondary communication unit" refers to an at least one-dimensional, two-dimensional, or three-dimensional, distance between the primary wireless communication unit and the secondary communication unit. In an implementation of the present disclosure, the position of one of the primary or secondary communication units is known or predetermined. For example, one of the communication units is disposed in a predetermined location, for example in a parking lot or at a charging station. Thereby, an absolute position of the primary and secondary units can thereby be determined via the detected relative position and the known predetermined location.

In an implementation of the present disclosure, the primary pad for wireless power transmission and the primary wireless communication unit are contained in a common housing of the primary unit. Further, the secondary pad and the secondary wireless communication unit are contained in a common housing of the secondary unit. Thereby, a relative position of the primary wireless communication unit and the secondary communication unit essentially corresponds to a relative position of the primary pad and the secondary pad. Further, since distances between the primary pad and the primary wireless communication unit, and between the secondary pad and the secondary wireless communication unit are known, the relative position of the primary pad and the secondary pad can be determined from the relative positions of the primary and secondary wireless communication units.

In an implementation of the present disclosure, the primary unit and/or the secondary unit comprise further primary control unit(s) and/or secondary control unit(s) configured to control the wireless power transfer and/or the wireless communication. For instance, at least one or each of the primary pad and the secondary pad comprises a pad control unit and/or at least one or each of the primary wireless communication unit and the secondary wireless communication unit comprises a communication control unit. In the following, for ease of explanation, the control of the wireless power transmission system will be described by "the control unit". The control unit may represent one or more primary and/or secondary side control unit(s), especially in communication with one another. In addition or alternatively thereto, the control unit refers to a single control unit, for example a processing unit, configured to control the primary unit and the secondary unit, especially via wireless communication.

In an implementation of the present disclosure, the primary and secondary wireless communication units are configured to transmit and receive the communication signal and additionally or simultaneously use the communication signal for detecting the relative position of the primary wireless communication unit and the secondary wireless communication unit. Thereby, no additional sensor for detecting received power by the magnetic field of the power transmission by the pads is necessary for detecting the relative position.

In one advantageous embodiment, the primary wireless communication unit and the secondary communication unit are configured to provide a pad-to-pad near-field communication link for transmitting the communication signal. Further, the communication signal is a pad-to-pad link (commonly also referred to as "PPL"). Therein, the communication signal communicates for example identification of primary unit and secondary unit, power transmission requirements for controlling power transmission via the pads, or the like.

In an implementation of the present disclosure, in the near-field communication link, a 10 MHz to 15 MHz signal, a 13.56 MHz signal, for example, is used as a carrier for the transmission of data.

In an implementation of the present disclosure, the control unit is configured to detect a signal strength of the communication signal and to determine, based on the detected signal strength, the relative position of the primary wireless communication unit and the secondary wireless communication unit. Thereby, a simple detection process of signal strength of the communication signal can be advantageously employed to detect the relative position.

In an implementation of the present disclosure, the control unit is configured to detect at least the signal strength of the received communication signal. In an implementation of the present disclosure, the control unit is configured to detect the signal strength based on a detected maximum amplitude of the communication signal.

In an implementation of the present disclosure, the control unit is configured to calculate the relative position, i.e. the distance, by using a known or predetermined attenuation value of the signal per unit of distance or by comparing the detected value with a predetermined lookup table correlating detected signal strength and distances. For example, the control unit is configured to compare the transmitted signal strength or maximum amplitude with the received signal strength or maximum amplitude, calculate an attenuation value (i.e. a difference between transmitted and received signal strength) and therefrom calculate a distance.

In an implementation of the present disclosure, the wireless power transmission system, especially the control unit, comprises at least one analog-to-digital converter ("AD" or "ADC") respectively configured to measure the signal strength, especially the amplitude of the communication signal.

In one advantageous embodiment, when the primary and secondary wireless communication units are separated by a distance, the control unit is configured to:

in response to the distance is equal to or below a first predetermined distance, detect the relative position using the communication signal; and/or in response to the distance is equal to or below a second predetermined distance, transfer data using the communication signal.

In an implementation of the present disclosure, the first predetermined distance is larger than the second predetermined distance. Therein, the control unit is advantageously configured to transfer data using the communication signal only in response to the distance is equal to or below the second predetermined distance.

In an implementation of the present disclosure, in response to the distance is equal to or below the second predetermined distance, the primary and secondary wireless communication units transfer data, especially via the near-field communication link and/or pad-to-pad link.

In an implementation of the present disclosure, above the second predetermined distance, the primary and secondary wireless communication units transmit and receive the communication signal without the transfer of data.

For example, in response to the distance is equal to or below the second predetermined distance, a handshake can be carried out between the primary and secondary wireless communication units so as to establish data transfer. Such a handshake is, for example, achieved via polling of the communication signal between the primary and secondary wireless communication units. However, such polling does not transfer data.

Above the second predetermined distance, the communication signal is only used for determining relative position. Additionally, above the second predetermined distance, the communication signal may also be used for polling (i.e. only used for determined relative position and polling), without the transfer of data. For example, the communication signal may thereby be used for determining relative position at distances at which its signal strength is not adequate for data transfer, wherein however its signal strength may nonetheless be detected, for example via the polling.

In an implementation of the present disclosure, the control unit is configured to detect the relative position using the communication signal also in response to the distance is equal to or below the second predetermined distance. In other words, in response to the distance is equal to or below the second predetermined distance, the communication signal is used for data transfer as well as for determining of relative position.

In an implementation of the present disclosure, the control unit is configured to control the primary pad and the secondary pad to wirelessly transfer power in response to the distance is equal to or below a third predetermined distance, wherein the third predetermined distance is smaller than the second predetermined distance. Thereby, in response to the distance is equal to or below the first distance, determining of relative position (and subsequent/simultaneous positioning) can be carried out until the second distance is reached. Then, in response to the distance is equal to or below the second distance, data transfer and further relative position determination is carried out (and subsequent/simultaneous positioning) at least until the third distance is reached. Then, wireless power transfer is carried out in response to the distance is equal to or below the third distance.

In an implementation of the present disclosure, the control unit is configured to, in response to the distance is equal to or below a fourth predetermined distance, determine the relative position of the primary unit and the secondary unit with a higher accuracy than that in response to the distance is equal to the first predetermined distance and to the second predetermined distance.

In an implementation of the present disclosure, in response to the distance is equal to or below the third distance, the control unit is configured to detect the relative position using the communication signal (data transfer). Thereby, even during wireless power transfer, positioning of the primary unit and secondary unit can be further optimized until a distance between the two is advantageously minimized.

In an implementation of the present disclosure, each of the primary pad and the secondary pad comprises one or more coils for power transmission and/or power reception. In an implementation of the present disclosure, the aforementioned coils are not used or useable for the transmission/reception of the communication signal. The aforementioned coils are only employed for power transmission via inductive coupling. Further, the primary wireless communication unit and the secondary wireless communication unit are each not configured for power transmission. In other words, the primary pad and the secondary pad are configured to transfer energy, whereas the wireless communication units are configured to transfer information, wherein an energy transfer via the wireless communication units (for instance, an energy associated with data transfer) is negligible and minimal.

In one advantageous embodiment, each of the primary and secondary wireless communication units comprises at least one main communication antenna for transmitting and receiving the communication signal. In an implementation of the present disclosure, the main communication antennas are configured to provide the communication link and to transfer information, such as identity information or power transfer requirements for controlling power transmission via the pads. In an implementation of the present disclosure, the main communication antennas are not configured to substantially transfer energy (i.e. only in negligible amounts). In an implementation of the present disclosure, the control unit is configured to encode and/or decode the communication signal transferred between the main communication antennas.

In an implementation of the present disclosure, at least one of the primary wireless communication unit and the secondary wireless communication unit comprises at least two, especially four, auxiliary sensing antennas for receiving the communication signal so as to detect the relative position. In an implementation of the present disclosure, the auxiliary sensing antennas are configured to receive the communication signal.

In an implementation of the present disclosure, the auxiliary sensing antennas are configured to receive the communication signal from the main communication antenna of the respective other (primary or secondary) wireless communication unit. In an implementation of the present disclosure, the auxiliary sensing antennas are configured to receive the communication signal only for detecting the relative position, not however, for transfer of information. In an implementation of the present disclosure, the control unit is configured to detect the signal strength, especially the amplitude, received by the auxiliary sensing antennas. In an implementation of the present disclosure, the control unit is not configured to decode the communication signal received by the auxiliary sensing antennas.

Advantageously, the plurality of auxiliary sensing antennas are arranged to surround, especially symmetrically surround, the main communication antenna of the respective primary or secondary wireless communication unit. In an implementation of the present disclosure, the at least one main communication antenna is configured for transmitting the communication signal only and the at least two auxiliary sensing antennas are configured for receiving the communication signal only. In an implementation of the present disclosure, the at least two auxiliary sensing antennas comprise four auxiliary sensing antennas.

In an implementation of the present disclosure, the auxiliary sensing antennas and the main antenna of the respective primary or secondary wireless communication unit are separate elements, i.e. separate antennas. In an implementation of the present disclosure, the auxiliary sensing antennas and the main antenna are not connected to one another directly and electrically. In an implementation of the present disclosure, the auxiliary sensing antennas and the main antenna are connected separately to the at least one control unit and/or further electronic components such as amplifiers and/or microprocessors and/or multiplexers and/or analog-to-digital converters.

In one advantageous embodiment, the other one of the primary wireless communication unit and the secondary wireless communication unit comprises exactly one main communication antenna and no auxiliary sensing antennas. In an implementation of the present disclosure, one of the primary and the secondary wireless communication units comprises exactly one main communication antenna, and no auxiliary sensing antennas, whereas the other one of the primary and secondary wireless communication units comprises exactly one main communication antenna and a plurality, especially four, auxiliary sensing antennas. This asymmetric configuration of primary and secondary wireless communication units has the advantage in that manufacturing of one of these (i.e. especially the one not comprising auxiliary sensing antennas) can be advantageously simplified and material for the antennas can be advantageously saved.

In one advantageous embodiment, both the primary wireless communication unit and the secondary wireless communication unit each comprise exactly one main communication antenna and the plurality of auxiliary sensing antennas. Thereby, by providing symmetric or similar primary and secondary wireless communication units, manufacturing of the wireless power transmission system can be simplified.

In an implementation of the present disclosure, the control unit is configured to compare the signal strength of the communication signal received by the respective auxiliary sensing antennas so as to determine the relative position.

In an implementation of the present disclosure, the wireless power transmission system, especially the control unit, comprises at least one analog-to-digital converter ("AD" or "ADC") respectively connected to at least one auxiliary sensing antenna and configured to measure the signal strength, especially the amplitude of the communication signal received by at least one auxiliary sensing antenna. In an implementation of the present disclosure, the control unit comprises a multiplexer for selectively forwarding the communication signal received by the auxiliary sensing antennas and at least one analog-to-digital converter configured to measure signal strength of the communication signal.

In an implementation of the present disclosure, the control unit is configured to determine the relative position based on trilateration and/or based on curve fits and/or based on a sum and/or based on a lookup table of the signal strength of the communication signal received by the respective auxiliary sensing antennas.

In an implementation of the present disclosure, the control unit is configured to calculate a cumulated value, especially a sum, of the detected signal strength. Thereby, the control unit is configured to detect a size of an air gap between the primary unit and the secondary unit based on the calculated sum.

In one advantageous embodiment, the control unit is configured to modulate the communication signal, especially for data transfer, using on-off shift keying modulation. Therein, the data transferred by the communication signal is encoded by switching on and off the carrier signal.

Alternatively, especially above the second predetermined distance, especially before a handshake between the wireless communication units, the communication signal may be modulated for example as a constant high signal. Such a constant high signal may advantageously be used for polling.

In an implementation of the present disclosure, the secondary unit comprises one analog-to-digital converter for each antenna (each main communication antenna and each auxiliary sensing antenna).

In an implementation of the present disclosure, the secondary unit comprises one analog-to-digital converter for the main communication antenna, a multiplexer for the auxiliary sensing antennas, and a further, especially single, analog-to-digital converter connected to the multiplexer of the auxiliary sensing antennas.

Further, the secondary unit comprises a plurality of amplifiers and filters, each connected to one auxiliary sensing antenna.

Further, the primary unit and the secondary unit each comprise a microcontroller, a transceiver, and an antenna matching circuit connected to the respective main communication antenna for transferring the communication signal between the primary unit and the secondary unit, especially via the communication link, i.e. the pad-to-pad link.

In one advantageous embodiment, the secondary unit is provided in an electric vehicle. Therein, the electric vehicle comprises at least one battery unit configured to be charged by the power transferred from the primary pad to the secondary pad. Thereby, the wireless power transmission system is a wireless charging system ("WCS"). Further, the electric vehicle comprises the control unit.

In an implementation of the present disclosure, the electric vehicle is an industrial electric vehicle such as a forklift.

Alternatively, the electric vehicle is an elevator. Therein, the primary unit is comprised in an elevator shaft, especially at a bottom of an elevator shaft, and the secondary unit is comprised in the elevator, especially at or underneath a floor of the elevator.

In one advantageous embodiment, the primary unit is wall mounted. In other words, the primary unit is in a vertical arrangement.

In addition or alternatively thereto, the primary unit is floor mounted. In other words, the primary unit is in a horizontal arrangement.

In an implementation of the present disclosure, the main and/or auxiliary antenna(s) is/are (a) flat printed circuit board antenna(s).

In an implementation of the present disclosure, the control unit is a processor. For example, the control unit is a microcontroller ("MCU"), a CPU, a GPU, a SoC, an ASIC, an FPGA, or the like.

In an implementation of the present disclosure, the control unit is configured to calculate the relative position from the communication signal, especially the signal strength and in particular the signal amplitudes. In addition or alternatively thereto, the control unit is configured to compare the detected communication signal, its signal strength and/or its signal amplitudes with a lookup table, in which reference values for distances are stored, for example in a memory unit. Further in addition or alternative thereto, the control unit is configured to employ mathematical and/or stochastic methods or algorithms for determining the relative position based on the communication signal, especially signal strength and/or signal amplitude of the communication signal.

In an implementation of the present disclosure, the detection of relative position is independent of a detection of foreign objects ("FOD"). In other words, the wireless power transmission system does not employ sensors for FOD for further determining the relative position.

Although in the foregoing "a control unit" has been described, the wireless power transmission system comprises a plurality of control units.

In an implementation of the present disclosure, the control unit comprises a primary control unit and a secondary control unit, wherein the primary control unit is connected to the primary pad and the primary wireless communication unit, and wherein the secondary control unit is connected to the secondary pad and the secondary wireless communication unit. In an implementation of the present disclosure, the primary control unit is included in the primary unit and the secondary control unit is included in the secondary unit.

In an implementation of the present disclosure the secondary control unit is configured to detect the relative position as described in the foregoing. Further, the primary control unit is configured to control the wireless power transmission of the primary pad and the transmission of the communication signal by the primary wireless communication unit. In an implementation of the present disclosure, the primary and the secondary control unit communicate with one another, especially via the communication signal. In an implementation of the present disclosure, the communication between the primary and the secondary control units is carried out at or below the second predetermined distance.

Further, the primary control unit, especially only the primary control unit, comprised by the primary unit is configured to detect the relative position.

In both cases of only the primary control unit or only the secondary control unit detecting the relative position, the relative position is communicated between the primary unit and the secondary unit, via the wireless communication units, especially via the near-field communication link or the pad-to-pad link.

Further, both the primary control unit and the secondary control unit, respectively comprised by the primary unit and the secondary unit, are configured to detect the relative position. Thereby, the detected relative position does not need to be communicated between the primary unit and the secondary unit.

The present invention also concerns a method of detecting a relative position of the primary wireless communication unit and the secondary wireless communication unit, wherein the foregoing described configurations of the control unit for controlling elements/units of the wireless power transmission system are understood as method steps.

BRIEF DESCRIPTION OF DRAWINGS

Further details, advantages, and features of the preferred embodiments of the present invention are described in detail with reference to the figures. Therein.

DESCRIPTION OF EMBODIMENTS

Figure 1:
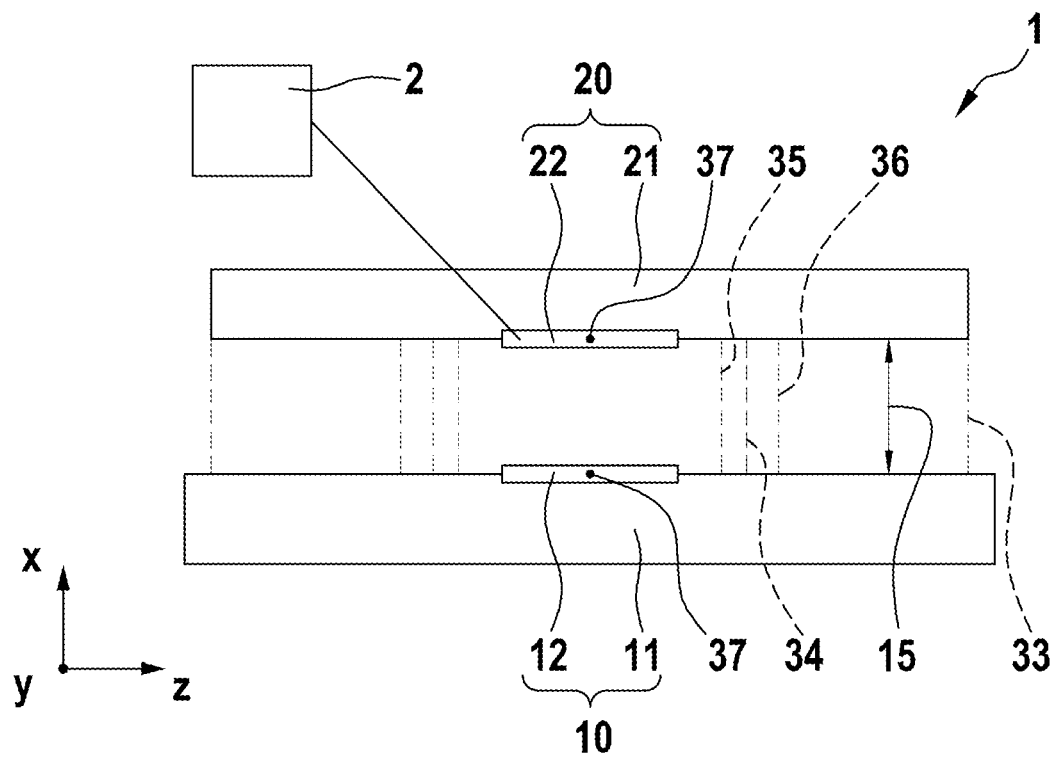
FIG. 1 shows a top view of a wireless power transmission system according to a first embodiment of the present invention in a vertical mounting orientation.

FIG. 1 shows a top view of a wireless power transmission system 1 according to a first embodiment of the present invention in a vertical mounting orientation (wall-mounted).

Figure 2:
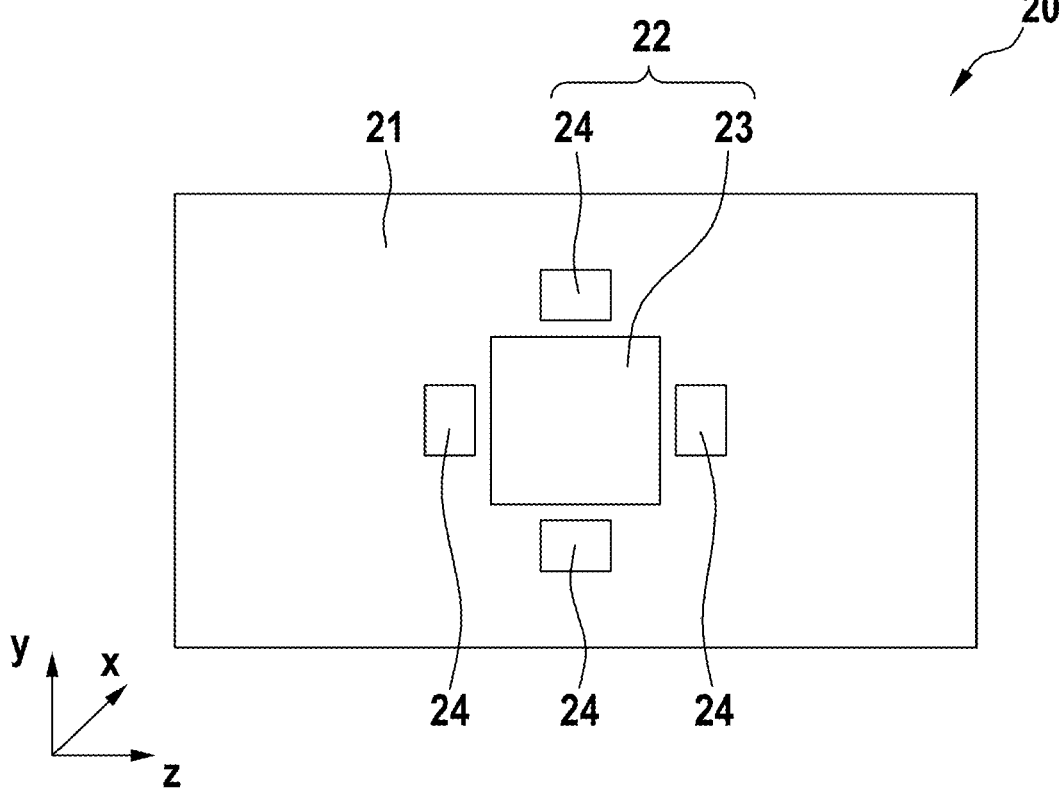
FIG. 2 shows a detail side view of components of the wireless power transmission system according to the first embodiment of the present invention.

FIG. 2 shows a detail side view of components of the wireless power transmission system 1 according to the first embodiment of the present invention.

Figure 3:
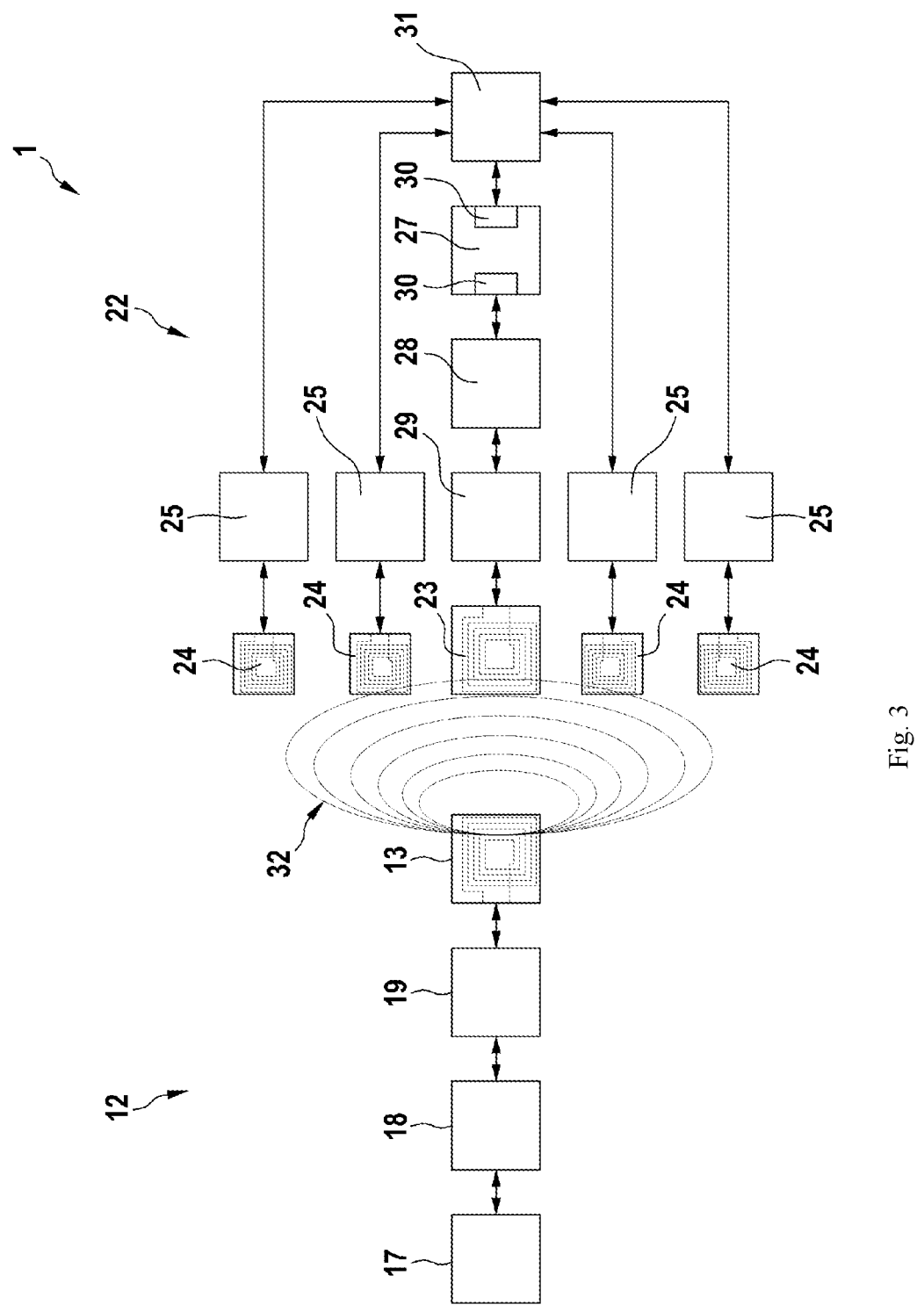
FIG. 3 shows a block diagram for explaining functions of the wireless power transmission system according to the first embodiment of the present invention.

FIG. 3 shows a block diagram for explaining functions of the wireless power transmission system 1 according to the first embodiment of the present invention.

As can be taken from FIG. 1, the wireless power transmission system 1 comprises a primary unit 10 and a secondary unit 20, between which power is to be transferred wirelessly, especially via an air gap 15.

The primary unit 10 comprises a primary pad 11 for wireless power transmission. The secondary unit 20 comprises a secondary pad 21 for wireless power reception, especially from the primary pad 11. Each of the primary pad 11 and the secondary pad 21 comprises coils (not shown), which inductively couple with one another to wirelessly transfer electromagnetic energy.

Herein, for example, the wireless power transmission system 1 is configured to perform high-powered wireless charging (see also implementation example of FIG. 5) in a range of 50 kHz to 80 kHz with a wattage of 1 kW to 75 kW.

As can be taken from the top view of FIG. 1, the primary unit 10 is wall mounted. In an alternative embodiment, the primary unit 10 may be floor mounted.

The primary unit 10 further comprises a primary wireless communication unit 12. The secondary unit 20 further comprises a secondary wireless communication unit 22. The primary and secondary wireless communication units 12, 22 are shown schematically in FIG. 1. The secondary wireless communication unit 22 will be explained in more detail below with reference to FIG. 2.

Herein, the primary and secondary wireless communication units 12, 22 are configured to exchange information via near-field communication. In other words, the primary and secondary wireless communication units 12, 22 are configured to provide a near-field communication link as a communication signal. This is especially referred to as a "pad-to-pad link" (also known as "PPL"). In the present embodiment, the communication signal is encoded via on-off-shift keying modulation. However, the present disclosure is not limited to such modulation, and alternative known modulation types may be implemented herein.

In the present embodiment, the communication signal includes (i.e. is encoded with) information regarding, for example, device identification, power transfer requirements for controlling power transmission via the pads, or the like. For example, a high number of secondary units 20 can be provided, for example in an industrial building, which are alternately supplied with power by the primary unit 10, and which therefore include identification information and/or respective power supply requirement information.

Furthermore, the wireless power transmission system 1 comprises a control unit 2. In the present embodiment, the control unit 2 is connected to the secondary wireless communication unit 22. In addition, the control unit 2 is connected to the primary wireless communication unit 12 and/or the primary pad 11 and/or the secondary pad 21. In particular, the control unit 2 is connected wirelessly to any one or more of the foregoing described units.

In an implementation of the present disclosure, although not shown, the wireless power transmission system 1 comprises a plurality of control units, wherein each of the primary unit 10 and the secondary unit 20 comprises a (primary or secondary) control unit, which are respectively connected especially wirelessly to the control unit 2. In other words, the control unit 2 of the present embodiment is a central control unit 2 for controlling the primary unit 10 and the secondary unit 20. In an implementation of the present disclosure, the control unit 2 may be comprised by the primary unit 10 or the secondary unit 20 and may be connected especially wirelessly to other (primary or secondary or central) control unit(s).

The control unit 2 is configured to detect a relative position of the primary wireless communication unit 12 and the secondary wireless communication unit 22 using said communication signal. Herein, the control unit 2 is configured to detect a distance, especially a three-dimensional distance, between the primary unit 10 and the secondary unit 20. This distance is then further used to bring the primary unit 10 and the secondary unit 20 into optimal alignment for power transmission.

As can be taken from FIG. 1, multiple predetermined distances 33, 34, 35, 36 may be defined from center points 37 of the primary wireless communication unit 12 and the secondary wireless communication unit 22.

Therein, depending on the distance between the center points 37, the control unit 2 is configured to carry out different modes of operation:

In response to the distance is equal to or below the first predetermined distance 33, the control unit 2 is configured to detect the relative position of the communication units 12, 22. Therein, the control unit 2 is especially configured to only detect the relative position, without transfer of data between the communication units 12, 22 via the communication signal.

In response to the distance is equal to or below a second predetermined distance 34, the control unit 2 is configured to transfer data using the communication signal, especially via a handshake establishing the near-field communication link or pad-to-pad link between the communication units 12, 22. Above this second distance 34, the communication link may not be adequately stable for data transfer, such that it is only used for determining relative position. In addition to being used for determining relative position, the communication signal may be used at least in response to the distance is equal to or above the second distance 34 for polling between the primary unit 10 and the secondary unit 20, for example for establishing the handshake. In other words, in response to the distance is above the second distance 34, the communication signal is not used for data transfer, and is only used for determining relative position and polling.

Further, in response to the distance is equal to or below this second distance 34, the control unit 2 is further configured to use the communication signal for determining the relative position of the primary unit 10 and the secondary unit 20 in addition to data transfer.

In response to the distance is equal to or below a third predetermined distance 35, which is below the second predetermined distance 34, the control unit 2 is configured to control the primary pad 11 and/or the secondary pad 12 for wirelessly transferring power, especially in coordination with the data transferred by the communication signal. Furthermore, in this region, the control unit 2 may further detect the relative position for further optimized positioning of the primary unit 10 and the secondary unit 20.

Further yet, in response to the distance is equal to or below a fourth predetermined distance 36, the control unit 2 is configured to determine more accurately the relative position of the primary unit 10 and the secondary unit 20.

Although FIG. 1 shows the predetermined distances 33-36 being along the z-axis, these distances 33-36 are not necessarily limited thereto. Instead, these may be understood as three-dimensional distances (distance regions), or in case for example heights (i.e. y-direction in FIG. 1) of the primary unit 10 and the secondary unit 20 are fixed, may be understood as two-dimensional distances (distance regions), especially in a plane defined by x-, and z-axes. Of course, this teaching can be easily transferred to the possible case of the primary unit 10 being floor mounted.

The detection of the relative position will be explained in further detail especially in view of FIG. 2. FIG. 2 shows in detail a configuration of the secondary unit 20 of the wireless power transmission system 1 shown in FIG. 1. However, the following explanations with respect to the secondary unit 20 can additionally or alternatively apply to the primary unit 10 and vice versa.

As shown in FIG. 2, the secondary wireless communication unit 22 comprises a main communication antenna 23 and four auxiliary sensing antennas 24. Herein, the main communication antenna 23 of the secondary wireless communication unit 22 communicates with a main communication antenna (not shown in FIG. 2, see FIGS. 3 and 4) 13 of the primary wireless communication unit 12, especially for data transfer. The control unit 2 is configured to decode the communication signal received by the main communication antenna 23 of the secondary unit 20. This data transfer is especially carried out in response to the distance is equal to or below the aforementioned second predetermined distance 34.

In an implementation of the present disclosure, the main communication antenna 23 and the auxiliary sensing antennas 24 are flat printed circuit board antennas.

The main communication antenna 23 and the four auxiliary sensing antennas 24 of the secondary wireless communication unit 22 are configured to receive the communication signal sent by the main communication antenna 13 of the primary wireless communication unit 12.

The control unit 2 is configured to detect the relative position of the primary wireless communication unit 12 and the secondary wireless communication unit 22 using the communication signal received by the auxiliary sensing antennas 24 of the secondary wireless communication unit 22. In particular, the control unit 2 is not configured to decode the communication signal received by the auxiliary sensing antennas 24. Instead, the control unit 2 uses the signal received by the auxiliary sensing antennas 24 only to detect the relative position.

This detection of the relative position is especially carried out in response to the distance is equal to or below the aforementioned first predetermined distance 33.

Herein, the auxiliary sensing antennas 24 are arranged so as to symmetrically surround the main communication antenna 23 of the secondary wireless communication unit 22. The auxiliary sensing antennas 24 are not connected directly to the main communication antenna 23 (see also FIGS. 3 and 4).

Each of the auxiliary sensing antennas 24 of the secondary unit 20 receives the communication signal from the main communication antenna 13 of the primary unit 10. Since the auxiliary sensing antennas 24 are provided at different positions, the attenuation of the communication signal received by each of these will differ such that measured amplitudes thereof will differ.

Figure 4:
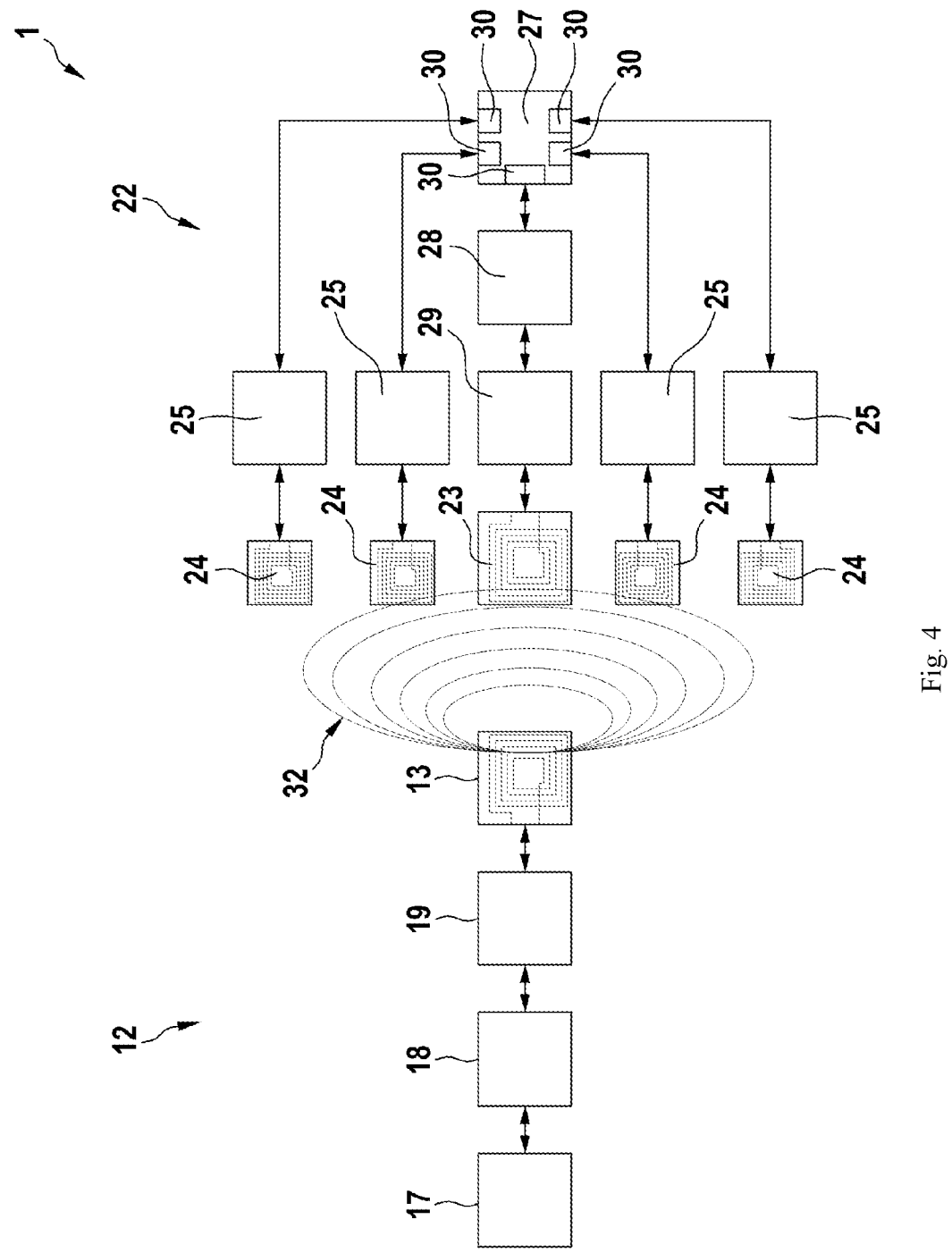
FIG. 4 shows a block diagram for explaining functions of a wireless power transmission system according to a second embodiment of the present invention.

As shown in FIGS. 3 and 4, and as will be explained in more detail below, the wireless power transmission system 1, especially the control unit 2, comprises an analog-to-digital converter 30 configured to measure amplitudes of the communication signal received by each of the auxiliary sensing antennas 24.

Therein, the auxiliary sensing antennas 24 receive amplitudes $A_1$, $A_2$, $A_3$ and $A_4$. The control unit 2 is configured to compare the amplitudes and to determine the relative position via trilateration, wherein:

$$A_1(x_P - x_S, y_P - y_S, z_P - z_S)$$
$$A_2(x_P - x_S, y_P - y_S, z_P - z_S)$$
$$A_3(x_P - x_S, y_P - y_S, z_P - z_S)$$
$$A_4(x_P - x_S, y_P - y_S, z_P - z_S).$$

Therein, x, y, and z refer to Cartesian space coordinates, whereas the subscripts "s" and "p" refer to the secondary unit and the primary unit, respectively. For example, "xp-xs" denotes the distance, in x-direction, between the primary unit and the secondary unit.

Since the position of the primary unit 10 is known or predetermined, especially when the primary unit 10 is wall mounted or floor mounted, commonly employed equations for trilateration can be solved using at least three of the measured amplitudes.

In other words, the secondary unit 20 may comprise exactly three auxiliary sensing antennas 24. In the present embodiment, the fourth auxiliary sensing antenna 24 is provided for additional accuracy and/or symmetry.

Further, the control unit 2 is configured to measure the amplitude received by the main communication antenna 23. Thereby, the secondary unit 20 may comprise exactly two auxiliary antennas 24 such that in sum three amplitudes are used for the trilateration.

Furthermore, the control unit 2 may be configured to calculate a cumulated value, especially a sum, of the detected amplitudes. Thereby, the control unit 2 is configured to detect a size of the air gap 15 between the primary unit 10 and the secondary unit 20 on the basis of said value or sum.

The configuration of the wireless communication units 12, 22 will now be explained with reference to FIG. 3.

The primary wireless communication unit 12 comprises a microcontroller 17 ("MCU"), a transceiver unit 18, an antenna matching unit 19, and the main communication antenna 13. The MCU 17, the transceiver unit 18, and the antenna matching unit 19 are configured to control the main communication antenna 13 for generating the communication signal 32 transmitted by the main communication antenna 13. The MCU 17 communicates with or is controlled by the control unit 2.

Further, the secondary wireless communication unit 22 comprises the four auxiliary sensing antennas 24 and the main communication antenna 23. Furthermore, the secondary wireless communication unit 22 comprises four amplifier units 25, one for each auxiliary sensing antenna 24, wherein the amplifier units 25 are configured to amplify the communication signal received by the respective auxiliary sensing antenna 24. The secondary wireless communication unit 22 additionally comprises an MCU 27, a transceiver unit 28, and an antenna matching unit 29 for reception and matching of the communication signal received by the secondary main communication antenna 23.

Further, the MCU 27 comprises two analog-to-digital converters 30 for conversion of the received communication signal. Thereby, the MCU 27 is configured to detect an amplitude of said communication signal. A multiplexer 31 connects each of the amplifier units 25 with the MCU 27, more precisely with one of the analog-to-digital converters 30 of the MCU 27. Thereby, the amplitude of the communication signal received by the auxiliary sensing antennas 24 and amplified by the amplifier units 25 is selectively forwarded to the MCU 27 for processing thereof.

The MCU 27 of the secondary unit 20 is especially connected to or included in the control unit 2 so as to perform the foregoing described relative position determination.

As demonstrated by the bidirectional connections, i.e. the bidirectional flows between the blocks of FIG. 3, the secondary wireless communication unit 22 may also be controlled to transmit the communication signal 32, wherein the primary wireless communication unit 12 may also be controlled to receive the communication signal 32.

FIG. 4 shows a block diagram of the wireless power transmission system 1 according to a second embodiment of the present invention. In particular, FIG. 4 shows a configuration of the wireless communication units 12, 22 of the second embodiment of the present invention.

Therein, the MCU 27 on the secondary side comprises four analog-to-digital converters 30, each connected to one amplifier unit 25, i.e. each connected to one auxiliary sensing antenna 24. The MCU 27 further comprises the analog-to-digital converter 30 connected to the secondary side transceiver unit 28.

Figure 5:
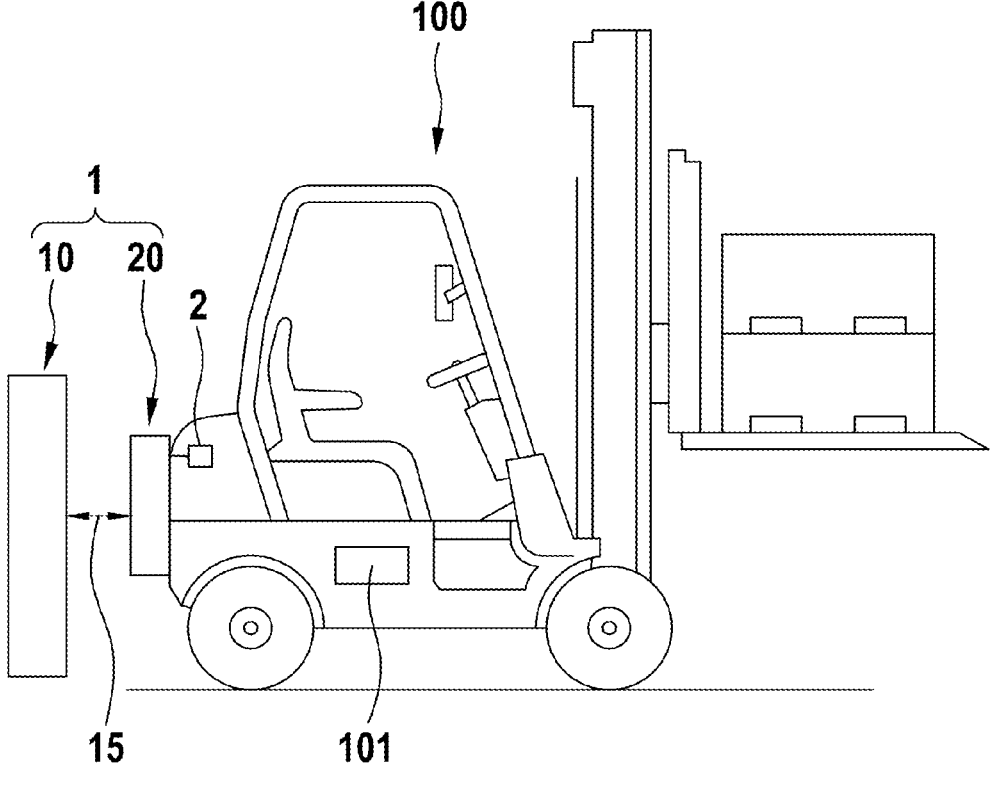
FIG. 5 shows a schematic drawing of an implementation example of the wireless power transmission system according to the first embodiment or the second embodiment of the present invention.

FIG. 5 shows a schematic drawing of an implementation example of the wireless power transmission system 1 according to the first embodiment or the second embodiment of the present invention.

In the present implementation example, the secondary unit 20 of the wireless power transmission system 1 is comprised by an electric vehicle 100. For example, the electric vehicle 100 is a forklift, especially an autonomous forklift. Alternatively, the electric vehicle 100 may be an autonomous robot or the like, especially in implementations of the wireless power transmission system 1 in storage facilities, wherein the electric vehicle (autonomously or human-driven) retrieves and/or places stored items in the facility. Alternatively, the electric vehicle 100 may be an electric automobile or the like.

Herein, the primary unit 10 is especially wall-mounted. The electric vehicle 100 comprises the control unit 2 and the secondary unit 20. Further, the electric vehicle 100 comprises a battery unit 101, wherein the battery unit 101 is charged via wireless power transmission from the primary unit 10.

Alternatively, the primary unit 10 may be floor mounted. Therein, the orientation or mounting position of the secondary unit 20 may correspondingly vary in accordance with the mounting position of the primary unit 10. For example, if the primary unit 10 is floor mounted, then the secondary unit 20 may be mounted at or under a floor of the electric vehicle 100.

With the foregoing described wireless power transmission system 1, the relative position of the primary unit 10 mounted on the wall and the secondary unit 20 mounted on the electric vehicle 100 can be detected. Further, using the detected result, especially via the control unit 2, the electric vehicle 100 can be efficiently and easily controlled so as to bring the secondary unit 20 into close alignment in three-dimensional space with the primary unit 10 for efficient wireless power transmission.

In a further possible implementation, the electric vehicle 100 may also be an elevator. Therein, the primary unit 10 is mounted at a bottom of an elevator shaft, wherein the secondary unit 20 is mounted at or below a floor of the elevator. Thereby, advantageously, wear of a cable connecting electronics of the elevator can be prevented by replacing such a cable with the wireless power transmission system of the present invention.

In addition to the foregoing written explanations, it is explicitly referred to FIGS. 1 to 5, wherein the figures in detail show logic circuit diagrams and configuration examples of the present disclosure.

What is claimed is:

1. A wireless power transmission system, comprising:
   a primary unit comprising a primary pad for wireless power transmission and a primary wireless communication unit; a secondary unit comprising a secondary pad for wireless power reception and a secondary wireless communication unit; and a control unit; wherein the primary pad and the secondary pad are configured to wirelessly transfer power via inductive coupling, wherein the primary and secondary wireless communication units are configured to transmit and receive a communication signal, and wherein the control unit is configured to detect a relative position of the primary wireless communication unit and the secondary wireless communication unit using the communication signal,
   wherein the primary and secondary wireless communication units are separated by a distance and the control unit is configured to:
   in response to the distance being equal to or below a first predetermined distance, detect the relative position using the communication signal; and
   in response to the distance being equal to or below a second predetermined distance, transfer data using the communication signal;
   wherein the first predetermined distance is larger than the second predetermined distance, and wherein the control unit is configured to transfer data using the communication signal only in response to the distance being equal to or below the second predetermined distance.

2. The wireless power transmission system according to claim 1, wherein the primary wireless communication unit and the secondary wireless communication unit are configured to provide a pad-to-pad near-field communication link for transmitting the communication signal.

3. The wireless power transmission system according to claim 1, wherein the control unit is configured to detect a signal strength of the communication signal and to determine, based on the detected signal strength, the relative position of the primary wireless communication unit and the secondary wireless communication unit.

4. The wireless power transmission system according to claim 3, wherein the control unit is configured to detect the signal strength based on a detected maximum amplitude of the communication signal.

5. The wireless power transmission system according to claim 1, wherein the control unit is configured to, in response to the distance being equal to or below a third predetermined distance, control the primary pad and the secondary pad to wirelessly transfer power, wherein the third predetermined distance is smaller than the second predetermined distance.

6. The wireless power transmission system according to claim 1, wherein the control unit is configured to, in response to the distance being equal to or below a fourth predetermined distance, determine the relative position of the primary unit and the secondary unit with a higher accuracy than that in response to the distance being equal to the first predetermined distance and to the second predetermined distance.

7. The wireless power transmission system according to claim 1, wherein each of the primary pad and the secondary pad comprise one or more coils for power transmission and/or power reception.

8. The wireless power transmission system according to claim 1, wherein each of the primary and secondary wireless communication units comprises at least one main communication antenna for transmitting and receiving the communication signal.

9. The wireless power transmission system according to claim 8, wherein at least one of the primary wireless communication unit and the secondary wireless communication unit comprises at least two auxiliary sensing antennas for receiving the communication signal so as to detect the relative position.

10. The wireless power transmission system according to claim 9, wherein the at least two auxiliary sensing antennas are arranged symmetrically surrounding the main communication antenna.

11. The wireless power transmission system according to claim 10, wherein the at least one main communication antenna is configured for transmitting the communication signal only and the at least two auxiliary sensing antennas are configured for receiving the communication signal only.

12. The wireless power transmission system according to claim 10, wherein the at least two auxiliary sensing antennas comprise four auxiliary sensing antennas.

13. The wireless power transmission system according to claim 9, wherein one of the primary wireless communication unit and the secondary wireless communication unit comprises one main communication antenna and no auxiliary sensing antennas.

14. The wireless power transmission system according to claim 9, wherein the control unit further comprises a multiplexer for selectively forwarding the communication signal received by the auxiliary sensing antennas and at least one analog-to-digital converter configured to measure signal strength of the communication signal.

15. The wireless power transmission system according to claim 14, wherein the control unit is configured to compare the signal strength of the communication signal received by the respective auxiliary sensing antennas so as to determine the relative position.

16. The wireless power transmission system according to claim 1, wherein the control unit is configured to modulate the communication signal using on-off shift keying modulation for transferring data.

17. The wireless power transmission system according to claim 1, wherein the secondary unit is comprised by an electric vehicle.

18. The wireless power transmission system according to claim 1, wherein the primary unit is wall mounted or floor mounted.

* * * * *